Sept. 6, 1960 R. H. RUGABER ET AL 2,951,901

BINARY CODE CONVERTER

Filed Nov. 10, 1958 2 Sheets-Sheet 1

INVENTOR.
ROBERT H. RUGABER
JOSEPH P. WELSH

BY Richard G. Stahr

ATTORNEY

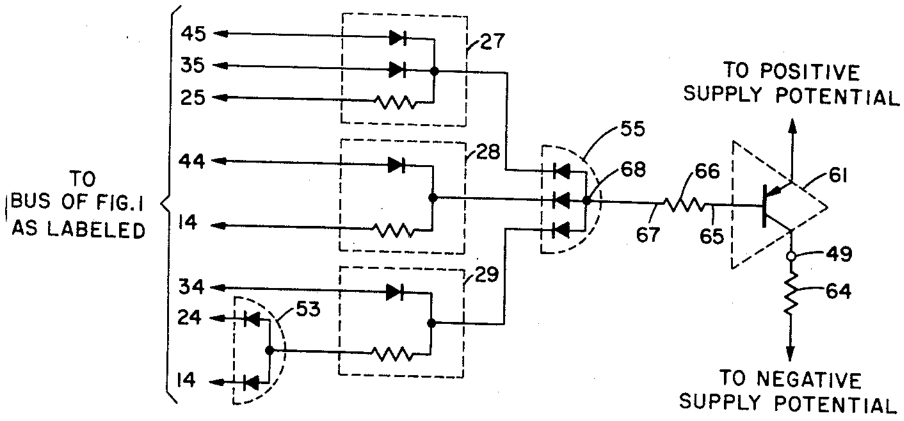
Fig. 2
| DIGIT | 10 A | 10 B | 20 A | 20 B | 30 A | 30 B | 40 A | 40 B | FLEXOWRITER CODE 1 | 2 | 3 | 4 | 5 | 6 |
|---|---|---|---|---|---|---|---|---|---|---|---|---|---|---|
| 0 | 0 | 1 | 0 | 1 | 0 | 1 | 0 | 1 | 1 | 1 | 1 | 1 | 1 | 0 |
| 1 | 1 | 0 | 0 | 1 | 0 | 1 | 0 | 1 | 0 | 1 | 0 | 1 | 0 | 1 |
| 2 | 0 | 1 | 1 | 0 | 0 | 1 | 0 | 1 | 1 | 1 | 1 | 0 | 0 | 1 |
| 3 | 1 | 0 | 1 | 0 | 0 | 1 | 0 | 1 | 1 | 1 | 0 | 0 | 0 | 1 |
| 4 | 0 | 1 | 0 | 1 | 1 | 0 | 0 | 1 | 1 | 0 | 1 | 0 | 0 | 1 |
| 5 | 1 | 0 | 0 | 1 | 1 | 0 | 0 | 1 | 1 | 0 | 0 | 1 | 0 | 1 |
| 6 | 0 | 1 | 1 | 0 | 1 | 0 | 0 | 1 | 1 | 0 | 1 | 1 | 0 | 1 |
| 7 | 1 | 0 | 1 | 0 | 1 | 0 | 0 | 1 | 1 | 1 | 0 | 1 | 0 | 1 |
| 8 | 0 | 1 | 0 | 1 | 0 | 1 | 1 | 0 | 1 | 0 | 0 | 0 | 0 | 1 |
| 9 | 1 | 0 | 0 | 1 | 0 | 1 | 1 | 0 | 1 | 1 | 0 | 1 | 1 | 0 |
Fig. 3
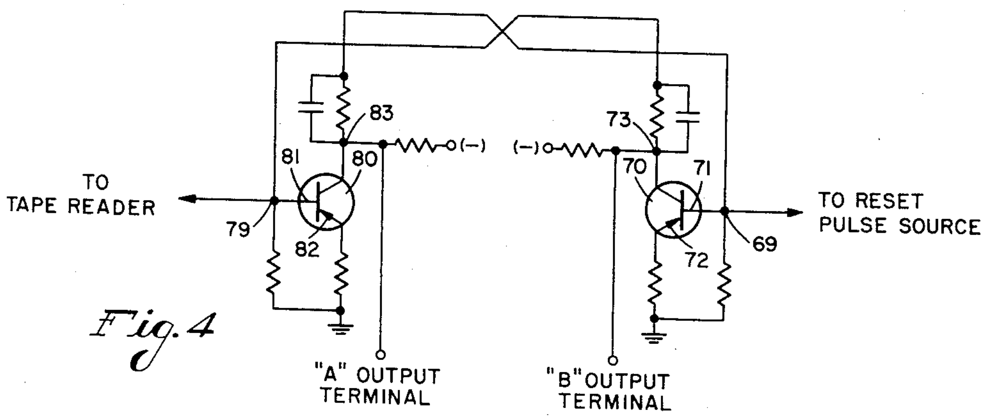
Fig. 4

United States Patent Office 2,951,901

Patented Sept. 6, 1960

2,951,901

BINARY CODE CONVERTER

Robert H. Rugaber and Joseph P. Welsh, Rochester, N.Y., assignors to General Dynamics Corporation, Rochester, N.Y., a corporation of Delaware Filed Nov. 10, 1958, Ser. No. 772,805

1 Claim. (Cl. 178—26)

The present invention relates to binary code converters and, more specifically, to translator devices for converting binary code representations of any specific number of bits per group into binary code representations of another specific number of bits per group.

In many instances, commercial equipment which utilizes information expressed in binary form is adapted to use only a binary code which is peculiar thereto. Installations having commercial equipment produced by more than one manufacturer, therefore, may require the use of two or more different binary codes to represent the same information. In these situations, therefore, it is mandatory that any of the binary codes may be converted into other binary codes compatible with the equipment with which it is to be used.

It is, accordingly, an object of this invention to provide an improved translator device for converting binary code representations of any specific number of bits per group into binary code representations of another specific number of bits per group.

It is another object of this invention to provide a translator device employing only solid-state components.

In accordance with this invention, a translator device is provided for converting binary code representations of any specific number of bits per group into binary code representations of another specific number of bits per group by producing a different combination of a plurality of electrical signals for each binary code representation to be converted and applying these different combinations of electrical signals to a plurality of switching circuits of the type which may be rendered conductive through the application thereto of one or more electrical signals in such a manner that each different combination of electrical signals presented thereto is effective to render those of the switching circuits conductive for completing a circuit therethrough to associated individual output circuits from which the converted binary code may be taken.

For a better understanding of the present invention, together with further objects, advantages and features thereof, reference is made to the following description and accompanying drawings, in which:

Figure 2 is a detail of a portion of the switching circuitry illustrated in block form in Figure 1;

Figure 1:
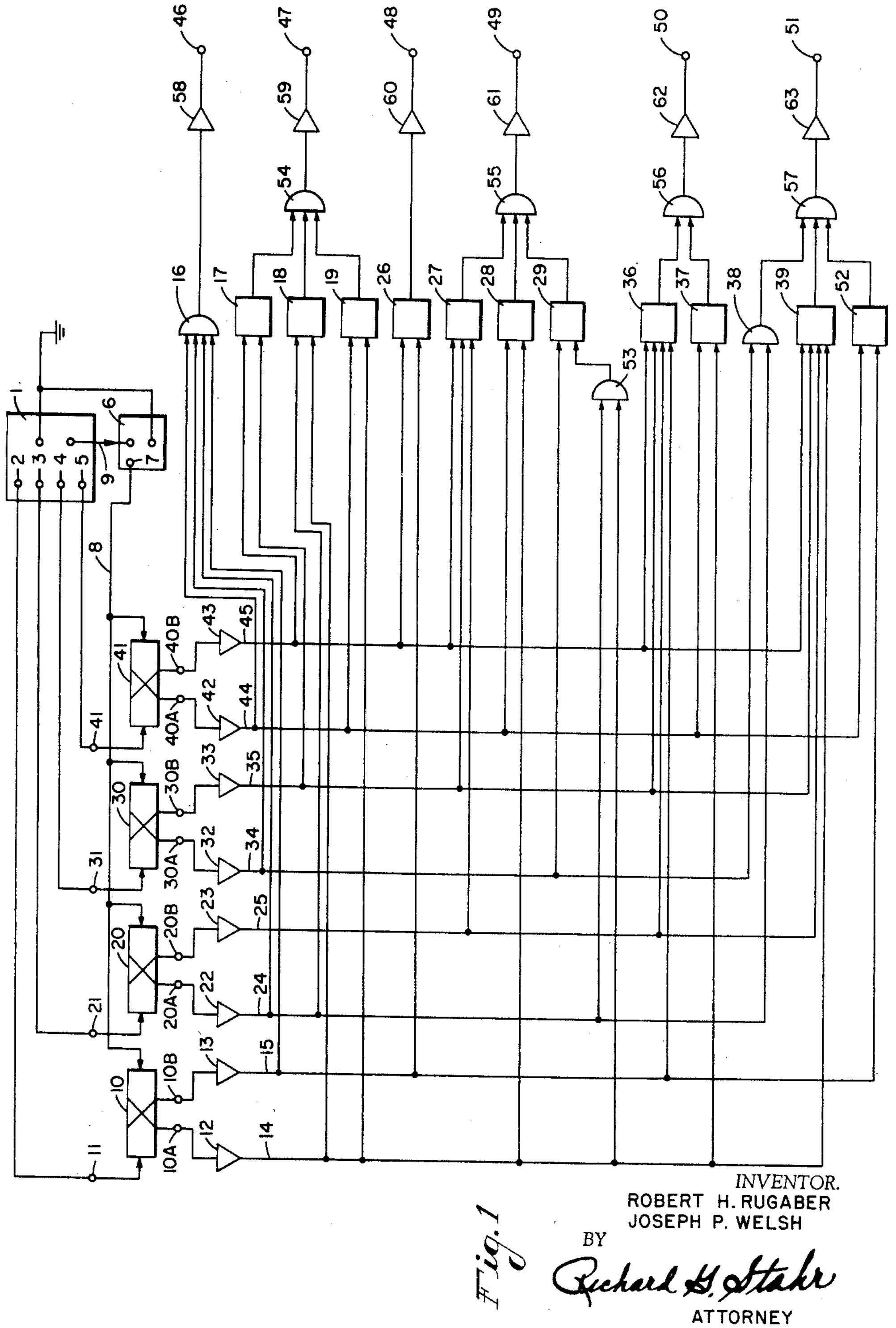
Figure 1 illustrates a preferred embodiment of this invention.

Figure 3 presents, in tabular form, certain information useful in understanding the present invention; and Figure 4 presents one circuit detail of the flip-flop, illustrated in block form in Figure 1, which may be used with this invention.

In the binary code system, discrete characters, that is, letters of the alphabet or decimal digits, may be expressed by a group of information bits of two different polarities, generally termed "mark" and "space" bits, wherein the presence of either polarity bit, selected to be significant, at any position within the group may be evidenced by the presence of a signal in that position while the presence of the other polarity bit at any position within the group may be evidenced by the absence of a signal in that position. For purposes of describing the present invention, and without intending or inferring that it be limited thereto, the "mark" information bits will be selected to be significant and will be evidenced by the presence of an electrical signal, denoted as "1," while the "space" information bits will be evidenced by the absence of a signal, denoted as "0."

A common application for the device of this invention is for converting a four information bit per group binary code representation of decimal numerals into another binary code having more than four information bits per group which is compatible with certain commercial equipment. For example, certain commercial equipment, such as that currently being marketed under the trademark "Flexowriter," employs a six bit per group code to which a four bit per group code must be converted to be compatible therewith.

For purposes of illustration only, therefore, and without intending or inferring that it be limited thereto, the following description of the present invention will be on the basis of converting a four bit per group binary code representation of decimal numbers into a six bit per group code representation of decimal numbers.

Although any suitable source of binary signals may be employed without departing from the spirit of this invention, a conventional tape reader, the details of which are well known in the art and form no part of this invention, will be assumed to be the signal source and is illustrated in block form in Figure 1 by reference numeral 1. This tape reader is provided with an individual output terminal, referenced by 2, 3, 4 and 5, for each position of the four bit binary code group. Consistent with the assumptions outlined hereinabove, a "mark" polarity bit at any position within the group will be evidenced by the presence of an electrical signal at the output terminal corresponding to that position and will be denoted as "1."

To produce the different combination of a plurality of electrical signals for each binary code representation, required for the operation of the system of the present invention, four bistable multivibrators, the details of which are well known in the art and form no part of this invention, are employed and are illustrated in block form in Figure 1 by reference numerals 10, 20, 30 and 40. Each of these bistable multivibrators is of the type which has two stable conditions of operation either of which may be produced through the application of a signal to one input thereof while the other may be produced by the application of a signal to the other input thereof and will hereinafter be referred to as flip-flops.

Each of the flip-flops, 10, 20, 30 and 40, is provided with two output terminals indicated in Figure 1 by reference numerals 10A and 10B, 20A and 20B, 30A and 30B, and 40A and 40B, respectively. When either side of any of the flip-flop circuits is conducting, no signal will appear at the output terminal of the same side while a signal will appear at the output terminal of the opposite side. That is, with the left side of the flip-flop 10 conducting, there will be no signal present at terminal 10A but a signal will be present at terminal 10B.

Connected to each output terminal, 10A, 10B, 20A, 20B, 30A, 30B, 40A and 40B, is an individual respective bus, 14, 15, 24, 25, 34, 35, 44 and 45, through respective conventional amplifiers, if required, illustrated in block form by reference numerals 12, 13, 22, 23, 32, 33, 42 and 43. As the flip-flop circuits are operating, therefore, it is apparent that, depending upon the condition of operation of the respective flip-flops, numerous combinations of electrical signals occupying any four of eight possible positions is produced by the flip-flops and is present in the buses associated therewith. The left side of the table of Figure 3 illustrates the various combinations of signals which may be thus produced for each of the decimal digits. In this table, the presence of a signal at any of the flip-flop output terminals is designated as "1."

To establish the initial operating conditions, a source of reset pulses, the details of which are well known in the art and form no part of this invention, is illustrated in block form in Figure 1 by reference numeral 6. A positive reset pulse, which appears at its output terminal 7, is applied to the right input circuit terminal of each of the flip-flops 10, 20, 30 and 40 through lead 8, as indicated thereby rendering the right side non-conducting. In the reset condition, therefore, the left side of each of the flip-flops is conducting and a signal appears at output terminals 10B, 20B, 30B and 40B. So that the source of reset pulse 6 may be synchronized with tape reader 1 to provide for the resetting of the flip-flops after each character has been received and before the next has been received, a synchronizing pulse may be applied from tape reader 1 through lead 9, as indicated.

Each of the flip-flops 10, 20, 30 and 40 is provided with a respective individual input circuit terminal, 11, 21, 31 and 41, each of which is connected to output terminal 2, 3, 4 and 5, respectively, of tape reader 1. The presence of a "mark" polarity bit, evidenced by the presence of a signal, at any one of the output terminals of tape reader 1, therefore, will be applied through the respective input terminal to the left side of the respectively flip-flop, thereby reversing its condition of operation. The reversal of the condition of operation of any of the flip-flops will produce a different combination of four electrical signals appearing in different buses than those in which they appeared as the flip-flops were in their reset condition. In this manner, then, a different combination of electrical signals may be produced with each binary code representation presented to flip-flops 10, 20, 30 and 40. While Figure 1 illustrates the connections for the parallel presentation of a binary representation to the four flip-flops, these representations may also be presented in series through the medium of connecting the four flip-flops as a binary counter and applying the binary code representation to the first flip-flop in series and stepping it along from one flip-flop to the next succeeding one as the bits are received in serial fashion.

An individual output circuit terminal is provided for each respective information bit position of the converted binary code group indicated by reference numerals 46, 47, 48, 49, 50 and 51. Consistent with this specification, the presence of an electrical signal at any of these output circuit terminals signifies the presence of a "mark" bit, denoted by "1," occupying that position and the absence of a signal signifies a "space" bit, denoted as "0," occupying that position. The converted binary code, therefore, may be taken off terminals 46, 47, 48, 49, 50 and 51 and applied to external equipment, not shown.

Interposed between the four flip-flops 10, 20, 30 and 40 and the converted binary code group output terminals 46, 47, 48, 49, 50 and 51 is a group of switching circuits each of the type which may be rendered conductive through the application thereto of one or more electrical signals. These circuits may be of the well known gate type which, since the details are well known in the art and form no part of this invention, are illustrated in block form by reference numerals 16–19, 26–29, 36–39, and 52–57. Of this group of switching circuits, those illustrated by reference numerals 16, 38, 53, 54, 55, 56 and 57 are of the type which will produce an output signal upon the presence of an electrical signal at any or all of their respective input circuit terminals and will hereinafter be referred to as OR gates while those circuits illustrated by reference numerals 17, 18, 19, 26, 27, 28, 29, 36, 37, 39 and 52 are of the type which will produce an output signal only upon the coincident presence of an electrical signal at all of their respective input circuit terminals and will hereinafter be referred to as AND gates. The output terminals of OR gates 16, 54, 55, 56 and 57 are connected to respective output terminals 46, 47, 49, 50 and 51 through conventional amplifiers, if required, illustrated in block form at 58, 59, 61, 62 and 63. To complete the connections from the switching circuits to the output circuit terminals, AND gate 26 is connected to output terminal 48 through a conventional amplifier, if required, illustrated in block form at 60.

The respective input circuit terminals of the several switching circuits are connected to the several buses, 14, 15, 24, 25, 34, 35, 44 and 45, in such a manner that the combinations of electrical signals appearing on these buses is effective to render those of the switching circuits conductive for completing a circuit therethrough to those of the individual output circuit terminals which correspond to those respective bit positions occupied by the "mark" information bits of the converted binary code representation, in a manner now to be described.

Assuming that the four bit per group binary code representation of the digit 2 is present at the output terminals of tape reader 1 and that the bit position to which output terminal 2 corresponds is the least significant position, an electrical signal will be present upon output terminal 3 only of tape reader 1 in that the four bit per group binary code representation of the digit 2 is "space," "mark," "space," "space." This signal, when applied to the right side of flip-flop 20 through individual input terminal 21 will reverse the condition of operation of flip-flop 20, rendering its right side conductive, and producing an electrical signal at terminal 20A and no electrical signal at terminal 20B. The combination of the four electrical signals produced by the four flip-flops, therefore, will appear at terminals 10B, 20A, 30B and 40B, as shown in Figure 3, which will result in the presence of an electrical signal in buses 15, 24, 35 and 45.

Assuming that output terminals 46, 47, 48, 49, 50 and 51 correspond to the first, second, third, fourth, fifth and sixth bit position of the converted six-bit-per-group binary code, and since the six-bit-per-group binary code representation of the digit 2 is the appearance of a "mark" bit in the first, second, third and sixth positions, thereof, see the right side of the table of Figure 3, an output electrical signal must be present on terminals 46, 47, 48 and 51.

As the respective input terminals of OR gate 16 is connected to buses 15, 24, 34 and 44, the electrical signal present in bus 24 is applied thereto which produces an output signal therefrom which is applied to output terminal 46 through amplifier 58.

The signals present in buses 35 and 45 are coincidentally applied to the two input terminals of AND gate 17, thereby producing an output signal therefrom which is applied to one of the input terminals of OR gate 54. This signal is passed by OR gate 54 to output terminal 47 through amplifier 59.

The electrical signals present upon buses 15 and 45 are coincidentally presented to both input terminals of AND gate 26, which produces an output signal which is impressed upon output terminal 48 through amplifier 60.

Neither AND gates 27, 28 nor 29 have applied to the input terminals thereof the necessary coincident electrical signals to produce an output signal therefrom, therefore, no output signal appears at output terminal 49. In the case of gate 27, there is no output signal present in bus 25, in the case of gate 28 there is no output signal present in buses 14 nor 44 and in the case of gate 29, there is no electrical signal present in bus 34.

AND gates 36 and 37 also do not have the required number of coincident signals present at their respective input circuit terminals, therefore, there is no output signal present upon output terminal 50. In the case of gate 36, there is no electrical signal present in bus 25, while in the case of gate 37 there is no electrical signal present in either of buses 14 or 44.

The electrical signal present in bus 24, however, is applied to one of the input terminals of OR gate 38, thereby producing an output signal therefrom which is also applied to one of the input terminals of OR gate 57. As only one signal is required for OR gate 57 to produce an output signal, this output signal is present upon output terminal 51 through amplifier 63. Therefore, an output signal is present upon output terminals 46, 47, 48 and 51, as required.

The six-bit-per-group binary code representation of the remaining nine digits may be produced upon output terminals 46, 47, 48, 49, 50 and 51 through the application of the various other combinations of electrical signals shown in the left table of Figure 3 to the several gate circuits in the same manner as has just been described.

Without intending or inferring that this invention be limited hereto, one switching circuitry scheme which was successfully employed in a tested model of a device of this invention is detailed in Figure 2 where like elements have been given like characters of reference. As the circuit details and operation of the switching circuitry involved with each output terminal is similar, in the interest of reducing drawing complexity, only that circuitry relative to output terminal 49, believed to be representative, is shown. It may be noted that OR gates 53 and 55 consist of two and three diodes, respectively, while AND gate 27 is a three input AND gate having two diodes in a resistor and AND gates 28 and 29 are each two input AND gates having a diode and a resistor each. The amplifier 61 may be a type P–N–P transistor, as indicated, and the output may be taken from output terminal 49 across resistor 64. Should amplifier 61 not be required, the end 65 of resistor 66 may be connected to ground and output terminal 49 inserted between end 67 of resistor 66 and output terminal 68 of gate 55.

Similarly, the circuitry of a bistable multivibrator or flip-flop, indicated in block form by reference numerals 10, 20, 30 and 40 of Figure 1, which may be used with a device of this invention is detailed in Figure 4. To establish the initial operating conditions as outlined earlier in this specification, that is, with the left side of each flip-flop conducting and a signal appearing at each "B" output terminal, a positive reset pulse from reset pulse source 6, Figure 1, may be applied to reset terminal 69, Figure 4. This positive reset pulse biases the base 71 of transistor 70 more positive than the emitter 72. At this condition does not satisfy the base-emitter bias requirements for conduction through a type P–N–P transistor, transistor 70 is rendered nonconductive. As transistor 70 is cut off, point 73 goes negative to susbtantially the supply potential and current is drawn through the emitter 82 and base 81 of transistor 80 thereby rendering transistor 80 conductive. As transistor 80 begins conduction, the potential at point 83 goes positive toward ground and is applied to the base 71 of transistor 70, thereby maintaining transistor 70 in a cutoff condition after the removal of the positive reset pulse from terminal 69. At transistor 80 is in a condition of conduction, point 83 is substantially at ground potential while point 73 is at a negative potential substantially equal to the supply potential. Therefore, a negative potential signal appears at the "B" output terminal while a zero or ground potential is present upon the "A" output terminal, thereby satisfying the initial operating conditions as hereinbefore set forth.

The presence of a positive-going signal from the tape reader, evidencing the presence of a "mark" polarity information bit, applied to input terminal 79 would reverse the condition of operation of this flip-flop circuit in the same manner.

While a preferred embodiment of this invention has been shown and described, it is obvious to those skilled in the art that various modifications, alterations and substitutions may be made without departing from the spirit of this invention which is to be limited only within the scope of the appended claim.

What is claimed is:

A translator device for converting first binary code representations of a first given plurality of bits per group into second binary code representations of a second given plurality of bits per group which is different from said first given plurality, said device comprising a second given plurality of output conductors, a second given plurality of polarity-sensitive gate means each of which has a single output circuit and a plurality of input circuits, means for individually connecting the output circuit of each gate means to a respective one of said output conductors, a first given plurality of flip-flop circuits each having an input circuit and a pair of output circuits, means for individually applying to the input circuit of each flip-flop circuit a respective one of the bit positions of a first binary code representation for producing a first polarity signal on one of said pair of output circuits and a second polarity signal on the other of said pair of output circuits of a flip-flop circuit in response to the bit position of the first binary code representation applied to the input circuit thereof having a first condition and producing said second polarity signal on said one of said pair of output circuits and said first polarity signal on said other of said pair of output circuits of a flip-flop circuit in response to the bit position applied to the input circuit thereof having a second condition, and means for connecting a unique combination of individual output circuits of said flip-flop circuits to the individual input circuits of each of said gate means to control the opening of each gate means in accordance with the polarities of the signals applied to the input circuits thereof to obtain on said output conductors second binary code representations which bear a one to one correspondence with the respective first binary code manifestations applied to the input circuits of said flip-flop circuits.

References Cited in the file of this patent

UNITED STATES PATENTS

| | | |
|---|---|---|
| Re. 24,447 | Bloch | Mar. 25, 1958 |
| 2,637,017 | Holden | Apr. 28, 1953 |
| 2,892,184 | Joel et al. | June 23, 1959 |
| 2,894,686 | Holmes | July 14, 1959 |